(12) United States Patent
Eagan

(10) Patent No.: US 12,454,543 B2
(45) Date of Patent: Oct. 28, 2025

(54) PROCESS FOR PRODUCTION OF ASCARYLOSE AND RELATED COMPOUNDS

(71) Applicant: Ascribe Bioscience Inc., Ithaca, NY (US)

(72) Inventor: James Eagan, Ithaca, NY (US)

(73) Assignee: Ascribe Bioscience Inc., Ithaca, NY (US)

( * ) Notice: Subject to any disclaimer, the term of this patent is extended or adjusted under 35 U.S.C. 154(b) by 492 days.

(21) Appl. No.: 18/007,435

(22) PCT Filed: Jul. 30, 2021

(86) PCT No.: PCT/IB2021/056981
§ 371 (c)(1),
(2) Date: Jan. 30, 2023

(87) PCT Pub. No.: WO2022/024067
PCT Pub. Date: Feb. 3, 2022

(65) Prior Publication Data
US 2023/0279040 A1    Sep. 7, 2023

Related U.S. Application Data

(60) Provisional application No. 63/059,363, filed on Jul. 31, 2020.

(51) Int. Cl.
    C07H 15/04        (2006.01)
    C07H 15/10        (2006.01)
    C07H 15/207       (2006.01)

(52) U.S. Cl.
    CPC ........... C07H 15/207 (2013.01); C07H 15/04 (2013.01); C07H 15/10 (2013.01)

(58) Field of Classification Search
    CPC ........ C07H 15/04; C07H 15/10; C07H 11/00; C07H 1/00
    See application file for complete search history.

(56) References Cited

U.S. PATENT DOCUMENTS 5,874,411 A    2/1999    Srivastava et al.

FOREIGN PATENT DOCUMENTS

| JP | 2001247592 A | 9/2001 |
| JP | 2019-126771 | 8/2019 |
| WO | 2018002957 A2 | 1/2018 |

OTHER PUBLICATIONS

De Lederkremer et al., Advances in Carbohydrate Chemistry and Biochemistry, 2007, 61, p. 143-216. (Year: 2007).*
Baer and Hannah, "Desulfonyloxylations of Some Secondary p-toluenesulfonates of Glycosides by Lithium Triethylborohydride; a High-Yielding Route to 2- and 3-deoxy Sugars," Carbohydrate Research, 1982, vol. 110, pp. 19-41.
Baer et al., "The formation of branched-chain deoxypentofuranosides by ring contraction in the reductive desulfonyloxylation of hexopyranoside p-toluenesulfonates," Canadian Journal of Chemistry, 1985, vol. 63, No. 2, pp. 432-439.
Binkley, "Reactions of p-Toluenesulfonates with Lithium Triethylborohydride. Visible and Hidden Rearrangements," J. Org. Chem., 1985, vol. 50, pp. 5646-56499.
Bongat and Demchenko, "Recent trends in the synthesis of O-glycosides of 2-amino-2-deoxysugars," Carbohydrate Research, 2007, vol. 342, pp. 374-406.
Capek et al., "3,6-Dideoxy-D-xylo-hexose, 4,6-dideoxy-D-xylohexose and their derivatives," Collection of Czechoslovak Chemical Communications, 1968, vol. 33, Issue 6, pp. 1758-1767.
Curtis et al., "Identification of Uric Acid Gluconucleoside-Ascaroside Conjugates in Caenorhabditis Elegans by Combining Synthesis and MicroED," Organic Letters, 2020, vol. 22, pp. 6724-6728.
Frihed et al., "Easy Access to L-mannosides and L-galactosides by Using C-H activation of the Corresponding 6-Deoxysugars," Angewandte Chemie Int Ed, 2012, vol. 51, pp. 12285-12288.
Gillingham et al., "Chemoenzymatic synthesis of differentially protected 3-deoxysugars," Nature Chemistry, Jan. 17, 2010, vol. 2, pp. 102-105.
Guo et al., "De Novo Asymmetric Synthesis and Biological Analysis of the Daumone Pheromones in Caenorhabditis elegans and in the Soybean Cyst Nematode Heterodera glycines," Tetrahedron, 2016, vol. 72, pp. 2280-2286.
Hermankova and Zobacova, "Reduction of secondary p-toluenesulphonyloxy groups with lithium aluminium hydride in sugar series. II. Reduction of a-and 13-methyl-4,6-0-benzylidene-2,3-di-O-p-toluenesulphonyl-D-galactopyranoside," Collection of Czechoslovak Chemical Communications, 1971, vol. 36, pp. 303-307.
Jary and Capek, "Amino Sugars. V. Preparation of methyl-3,4-anhydro-6-deoxy-a-D-galactopyranoside derivatives," Collection of Czechoslovak chemical communications, 1966, vol. 31, pp. 315-320.
Klaffke and Chambon, "Chemo-enzymatic synthesis of TDP-b-L-ascarylose," Tetrahedron, 2000, vol. 11, pp. 639-644.
Li and Yu, "Temporary ether protecting groups at the anomeric center in complex carbohydrate synthesis," Advances in Carbohydrate Chemistry and Biochemistry, 2020, vol. 77, pp. 77:1-69.
Martin et al., "Improved Synthesis of an Ascaroside Pheromone Controlling Dauer Larva Development in Caenorhabditis elegans," Synthesis. 2009, No. 20, pp. 3488-3492.

(Continued)

Primary Examiner — Jonathan S Lau
(74) Attorney, Agent, or Firm — Dechert LLP; John P. Rearick; Nicholas J. Pace

(57) ABSTRACT

This application relates to efficient methods for the synthesis of ascarylose and its derivatives. A method for the production of ascarylose includes: providing, as a feedstock, a 1-O-substituted rhamnose; forming a mono-sulfonate ester at the 3-OH group of the 1-O-substituted rhamnose; and treating the mono-sulfonate ester with a hydride source to form a 1-O-substituted ascarylose. Forming the monosulfonate ester can advantageously be conducted on a 1-O-substituted rhamnose without hydroxyl protecting groups at either the 2-OH or 4-OH-positions.

29 Claims, 1 Drawing Sheet

(56) References Cited

OTHER PUBLICATIONS

McNally and Overend, "The hydroxylation of some 2,3-unsaturated glycopyranosides," J Chem Soc, 1966, vol. 21, pp. 1978-1980.
Muramatsu et al., "Organotin-catalyzed highly regioselective thiocarbonylation of nonprotected carbohydrates and synthesis of deoxy carbohydrates in a minimum mumber of steps," Chem. Eur. J., 2012, vol. 18, pp. 4850-4853.
Nicolaou et al., "Chemical synthesis and biological evaluation of palmerolide A Analogues.," J Am Chem Soc., 2008, vol. 130, pp. 10019-10023.
Nicolaou et al., Supporting Information for "Chemical synthesis and biological evaluation of palmerolide A Analogues.," J Am Chem Soc., 2008, vol. 130, pp. 10019-10023.
Pozsgay, "Ring contraction by carbon participation in a hexopyranoside ring: Formation of benzyl 2-0-benzyl-3,5-dideoxy-3-C-benzyloxymethyl-a-L-pentofuranoside," Tetrahedron Letters, 1980, vol. 21, pp. 211-212.
Shibaev et al., "Synthesis of ascarylose from 3,6-dideoxy-L-erythro-hexos-2-ulose," Bulletin of the Academy of Sciences. 1980, vol. 29, No. 1, pp. 143-147.
Siewert and Westphal, "Substitution sekundarer Tosylestergruppen durch Jod Synthese von 4-Desoxy- und 4.6-Didesoxy-o-xy/o-hexose," Liebigs Ann Chem., 1968, vol. 720, pp. 161-170.
Tsuda et al., Lithium Aluminum Hydride Reduction of Glycopyranoside-Monosulfonates: Formation of Branched Furanosides, Chemical and Pharmaceutical Bulletin, 1991, vol. 39, No. 8, pp. 1983-1989.
Umezawa et al., "Studies on the Formation of Deoxy Sugars by Detosyloxylation with Lithium Aluminum Hydride," Bulletin of the Chemical Society of Japan, 1970, vol. 43, No. 4, pp. 1212-1218.
Varela, Cirelli, Lederkremer, "A crystalline furanose derivative of ascarylose. Synthesis of 2,5-di-O-benzoyl-3,6-dideoxy-a-L-arabino-hexofuranose," Carbohydrate Research, 1980, vol. 85, pp. 130-135.
Varela, Cirelli, Lederkremer, "b-Elimination in aldonolactones. Synthesis of 3,6-dideoxy L-arabino-hexose (ascarylose)," Carbohydrate Research, 1979, vol. 70, pp. 27-35.

Von Reuss et al., "Comparative Metabolics Reveals Biogenesis of Ascarosides, a Modular Library of Small-Molecule Signals in C. elegans," J. Am. Chem. Soc., 2012, vol. 134, No. 3, pp. 1817-1824.
Zhang et al., "Improved Synthesis for Modular Ascarosides Uncovers Biological Activity," Org Lett., 2017, vol. 19, No. 11, pp. 2837-2840.
Zhang et al., Supporting Information for "Improved Synthesis for Modular Ascarosides Uncovers Biological Activity," Org Lett., 2017, vol. 19, No. 11, pp. 2837-2840.
Zobacova et al., "Reduction of secondary p-toluenesulfonyloxy groups in the position 5 of hexofuranoses with lithium aluminum hydride," Collection of Czechoslovak Chemical Communications, 1975, vol. 40, Issue 11, pp. 3505-3511.
Zobacova et al., "Reduction of secondary p-toluenesulfonyloxy groups with lithium aluminum hydride in sugar series. III. Reduction of methyl 4,6-O-benzylidene-2,3-di-O-p-toluenesulfonyl-a-D-idopyranoside and a-D-altropyranoside," Collection of Czechoslovak Chemical Communications, 1971, vol. 36, No. 5, pp. 1860-1866.
Zobacova et al., "Reduktion sekundarer p-Toluolsulfonyloxygruppen mit Lithiumaluminiumhydrid in der Zuckerreihe," Collection of Czechoslovak Chemical Communications, 1970, vol. 31, Issue 1, pp. 327-333.
Mendoza-Espinoza, Jose Alberto et al., "Structural Reassignment, Absolute Configuration, and Conformation of Hypurticin, a Highly Flexible Polyacyloxy-6-heptenyl-5,6-dihydro-2H-pyran-2-one," Journal of Natural Products, Mar. 5, 2009, 72(5): 700-708.
Sarkar, Sujit et al., "Stereoselective Synthesis of 4-O-Tosyltetrahydropyrans via Prins Cyclization Reaction of Enol," SynOpen, Dec. 31, 2019, 3(1): 36-45.
LV et al., Regioselective Sulfonylation/Acylation of Carbohydrates Catalyzed by FeCl3 Combined with Benzoyltrifluoroacetone and Its Mechanism Study, The Journal of Organic Chemistry, vol. 85, No. 5, Jan. 27, 2020 [retrieved on Sep. 28, 2021]. Retrieved from the Internet: <URL: https://pubs.acs.org/doi/10.1021/acs.joc.9b03128>.

\* cited by examiner

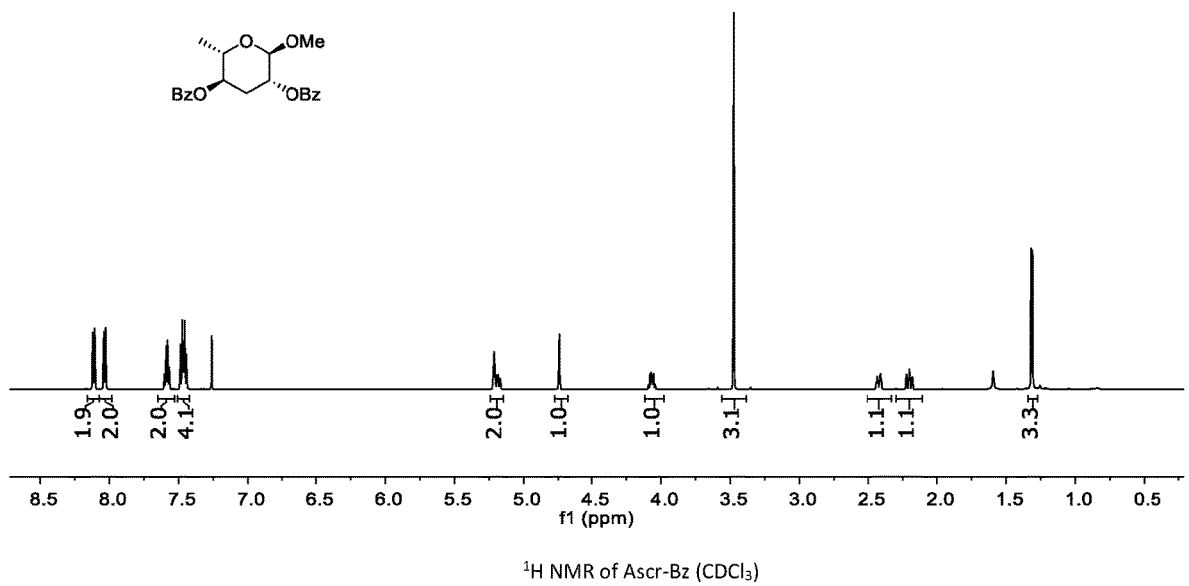
¹H NMR of Ascr-Bz (CDCl₃)

PROCESS FOR PRODUCTION OF ASCARYLOSE AND RELATED COMPOUNDS

CROSS-REFERENCE TO RELATED APPLICATIONS

This application is a national stage filing under 35 U.S.C. 371 of PCT/IB2021/056981, filed Jul. 30, 2021, which International Application was published by the International Bureau in English on Feb. 3, 2022, as WO 2022/024067, and application claims priority from U.S. Application No. 63/059,363, filed on Jul. 31, 2020, which applications are hereby incorporated in their entirety by reference in this application.

FEDERALLY SPONSORED RESEARCH OR DEVELOPMENT

This invention was made with U.S. Government support under Grant No. 1843116 awarded by the National Science Foundation. The U.S. Government has certain rights in this invention.

FIELD OF THE INVENTION

This application relates to the field of chemical synthesis, more specifically, the invention provides methods for the efficient production of ascarylose and its derivatives from rhamnose.

BACKGROUND OF THE INVENTION

Ascaroside natural products are secondary metabolites produced by nematodes. A large number of structurally diverse ascaroside structures have been identified in nature and the molecules are believed to function as an evolutionarily conserved chemical language used by nematodes to control many aspects of their development. Ascarosides are also perceived by other organisms and have been demonstrated to have a range of effects on numerous organisms including, bacteria, fungi, plants, and mammals including humans. Ascarosides hold potential as human medicines, agrichemicals and products for other diverse and valuable applications. Ascarosides are derivatives of the sugar ascarylose—a di-deoxy sugar lacking hydroxyl groups at its 3- and 6-positions. In nature, ascarylose is a relatively scarce sugar and no commercial sources of bulk ascarylose currently exist. As such, all reported total syntheses of ascarylose-containing natural products have relied on deoxygenation of more abundant sugar feedstocks such as rhamnose or mannose to access the ascarylose structure. While such methods are feasible for small studies and for research-focused natural product synthesis, accessing large quantities of ascarosides in this manner is impractical since existing synthetic routes to ascarylose require multi-step synthetic sequences that rely on expensive reagents and/or require chromatography for purification. As such, there remains a need for efficient, scalable methods to manufacture ascarylose and its derivatives.

SUMMARY OF THE INVENTION

Compositions and methods for the efficient production of ascarylose and ascarylose derivatives are provided. The methods use rhamnose as a starting material and comprise deoxygenating the 3-position of rhamnose without the need for protecting hydroxyl groups at the 2- or 4-positions. Thus, methods for converting 1-O-substituted rhamnose derivatives to 1-O-substituted ascarylose derivatives without the use of hydroxyl protecting groups are provided.

In one aspect of the present disclosure is provided a method for the production of ascarylose, comprising: providing, as a feedstock, a 1-O-substituted rhamnose having the structure of Formula II, wherein Z is a non-hydrogen substituent:

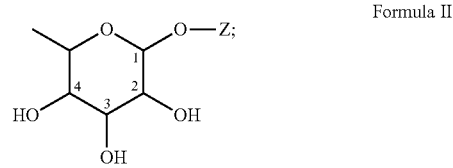

Formula II forming a mono-sulfonate ester at the 3-OH group of the feedstock; and treating the mono-sulfonate ester with a hydride source to form a 1-O-substituted ascarylose, wherein forming the mono-sulfonate ester is conducted on the 1-O-substituted rhamnose without hydroxyl protecting groups at either the 2-OH or 4-OH-positions.

When treating the mono-sulfate ester with a hydride source, a strong base may be added. When a strong base is added, the strong base may be added prior to the addition of the hydride source. Examples of a strong base include, but are not limited to, alkali metal hydrides, alkaline metal hydrides, alkali metal oxides, alkali metal alkoxides, and alkali metal amides. The strong base, in some embodiments, includes sodium or potassium.

The hydride source, in some embodiments, is a metal hydride. In an embodiment, two or more different metal hydrides may be used. For example, a first metal hydride can be an aluminum hydride or boron hydride reducing agent that is used in combination with a second metal hydride reducing agent that is an alkali metal hydride or an alkaline metal hydride. Exemplary first metal hydrides include LiAlH$_4$, LiBH$_4$, diisobutyl aluminum hydride and the like. An exemplary second metal hydride is sodium hydride.

In certain embodiments, forming the mono-sulfonate ester comprises contacting the feedstock with a sulfonyl halide or sulfonic acid anhydride in the presence of a Lewis acid catalyst. The Lewis acid catalyst can be a tin compound, for example, a dialkyl tin compound. An exemplary dialkyl tin compound is a dialkyl tin dihalide. Other Lewis acid catalysts can be used, such as Lewis acids that comprise boron or a transition metal.

In an embodiment, forming the mono-sulfonate ester comprises contacting the feedstock with a sulfonyl halide or sulfonic acid anhydride in the presence of a base. The base can be, e.g., an amine base.

In some embodiments, the feedstock comprises a 1-O-substituted rhamnose having the structure of Formula II:

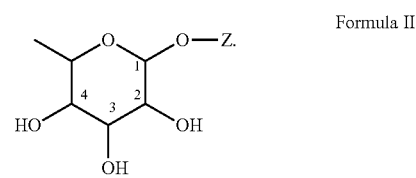

Formula II

In one embodiment, Z is methyl. In another embodiment, Z is an optionally substituted C$_{2-24}$ aliphatic group.

In another embodiment, Z is a group having the following formula:

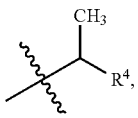

where $R^4$ is selected from the group consisting of:
an optionally substituted $C_{1-40}$ aliphatic group;
an optionally substituted $C_{1-40}$ carboxylic acid chain which may optionally be unsaturated at one or more positions; and
an ester or orthoester derivative of an optionally substituted $C_{1-40}$ carboxylic acid chain which may optionally be unsaturated at one or more positions.
For example, Z can be

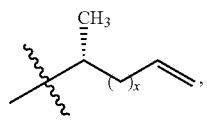

where x is an integer from 1 to 30. Specifically, Z can be

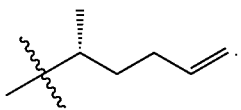 [SMILES: *[C@H](C)CCC=C]

When treating the mono-sulfonate ester with a hydride source to form a 1-O-substituted ascarylose, one or more functional groups on Z can be concomitantly reduced.

The resulting 1-O-substituted ascarylose may be isolated after treating the mono-sulfonate ester with a hydride source. The yield of the 1-O-substituted ascarylose is at least 40% yield based on the feedstock. In an embodiment, the disclosed method uses at least 1 kg of the feedstock.

In another aspect of the present disclosure a method is provided for the production of ascarylose, comprising: providing, as a feedstock, the 3-sulfonate ester of a 1-O-substituted rhamnose having the structure of Formula IV, wherein Z is a non-hydrogen substituent and Q is an optionally substituted aliphatic or aromatic moiety:

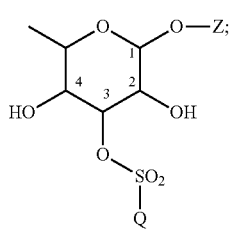

Formula IV and treating the mono-sulfonate ester with the combination of a strong base and a hydride source to form a 1-O-substituted ascarylose.

The disclosure includes, without limitation, the following embodiments:

Embodiment 1: A method for the production of 1-O-substituted ascarylose, comprising: providing as a feedstock a 1-O-substituted rhamnose having the structure of Formula II, wherein Z is a non-hydrogen substituent:

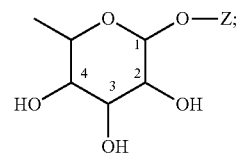

Formula II forming a mono-sulfonate ester at the 3-OH group of the feedstock; and treating the mono-sulfonate ester with a hydride source to form a 1-O-substituted ascarylose, wherein forming the mono-sulfonate ester is conducted on the 1-O-substituted rhamnose without hydroxyl protecting groups at either the 2-OH or 4-OH-positions.

Embodiment 2: The method of Embodiment 1, wherein treating the mono-sulfonate ester with a hydride source further comprises adding a strong base.

Embodiment 3: The method of Embodiment 2, wherein the strong base is added prior to addition of the hydride source.

Embodiment 4: The method of any of Embodiments 2-3, wherein the strong base is selected from the group consisting of alkali metal hydrides, alkaline metal hydrides, alkali metal oxides, alkali metal alkoxides, and alkali metal amides.

Embodiment 5: The method of any of Embodiments 2-4, wherein the strong base comprises a sodium or potassium ion.

Embodiment 6: The method of any of Embodiments 1-5, wherein the hydride source is a metal hydride.

Embodiment 7: The method of any of Embodiments 1-6, wherein treating the mono-sulfonate ester with a hydride source comprises contacting the mono-sulfonate ester with a first metal hydride and a second metal hydride.

Embodiment 8: The method of Embodiment 7, wherein the first metal hydride comprises an aluminum hydride or boron hydride reducing agent and the second metal hydride is an alkali metal hydride or an alkaline metal hydride.

Embodiment 9: The method of any of Embodiments 7-8, wherein the first metal hydride is $LiAlH_4$.

Embodiment 10: The method of any of Embodiments 7-8, wherein the first metal hydride is $LiBH_4$.

Embodiment 11: The method of any of Embodiments 7-10, wherein the second metal hydride is sodium hydride.

Embodiment 12: The method of any of Embodiments 1-11, wherein forming the mono-sulfonate ester comprises contacting the feedstock with a sulfonyl halide or sulfonic acid anhydride in the presence of a Lewis acid catalyst.

Embodiment 13: The method of Embodiment 12, wherein the Lewis acid catalyst comprises a tin compound.

Embodiment 14: The method of Embodiment 13, wherein the Lewis acid catalyst comprises a dialkyl tin compound.

Embodiment 15: The method of Embodiment 14, wherein the Lewis acid catalyst comprises a dialkyl tin dihalide.

Embodiment 16: The method of Embodiment 12, wherein the Lewis acid catalyst comprises a boron compound.

Embodiment 17: The method of Embodiment 12, wherein the Lewis acid catalyst comprises a transition metal.

Embodiment 18: The method of any of Embodiments 1-17, wherein forming the mono-sulfonate ester comprises contacting the feedstock with a sulfonyl halide or sulfonic acid anhydride in the presence of a base.

Embodiment 19: The method of Embodiment 18, wherein the base comprises an amine.

Embodiment 20: The method of any of Embodiments 1-19 wherein Z of Formula II is an optionally substituted $C_{2-24}$ aliphatic group.

Embodiment 21: The method of any of Embodiments 1-20, wherein the feedstock comprises 1-O-methyl rhamnose (i.e., Z of Formula II is $CH_3$).

Embodiment 22: The method of any of Embodiments 1-20, wherein Z of Formula II is a group having the following formula

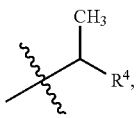

where $R^4$ is selected from the group consisting of: an optionally substituted $C_{1-40}$ aliphatic group; an optionally substituted $C_{1-40}$ carboxylic acid chain which may optionally be unsaturated at one or more positions; and an ester or orthoester derivative of an optionally substituted $C_{1-40}$ carboxylic acid chain which may optionally be unsaturated at one or more positions.

Embodiment 23: The method of any of Embodiments 1-20, wherein Z of Formula II is

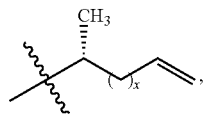

where x is an integer from 1 to 30.

Embodiment 24: The method of Embodiment 23, wherein Z of Formula II is

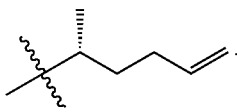

Embodiment 25: The method of any of Embodiments 1-24, wherein treating the mono-sulfonate ester with a hydride source to form a 1-O-substituted ascarylose concomitantly reduces one or more functional groups on Z.

Embodiment 26: The method of any of Embodiments 1-25, further comprising isolating the 1-O-substituted ascarylose.

Embodiment 27: The method of Embodiment 26, wherein the 1-O-substituted ascarylose is isolated in at least 40% yield based on the feedstock.

Embodiment 28: The method of any of Embodiments 1-27, wherein the method is conducted using at least 1 kg of the feedstock.

Embodiment 29: a method for the production of a 1-O-substituted ascarylose, comprising: providing, as a feedstock, the 3-sulfonate ester of a 1-O-substituted rhamnose having the structure of Formula IV, wherein Z is a non-hydrogen substituent and Q is an optionally substituted aliphatic or aromatic moiety:

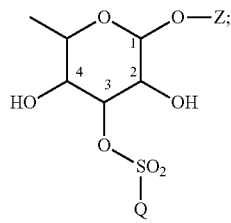

Formula IV and treating the mono-sulfonate ester with a strong base and a hydride source to form the 1-O-substituted ascarylose.

Embodiment 30: The method of Embodiment 29, wherein the strong base is added prior to addition of the hydride source.

Embodiment 31: The method of any Embodiments 29 or 30, wherein the strong base is selected from the group consisting of alkali metal hydrides, alkaline metal hydrides, alkali metal oxides, alkali metal alkoxides, and alkali metal amides.

Embodiment 32: The method of any of Embodiments 29-31, wherein the strong base comprises a sodium or potassium ion.

Embodiment 33: The method of any of Embodiments 29-32, wherein the hydride source is a metal hydride.

Embodiment 34: The method of any of Embodiments 29-33, wherein treating the mono-sulfonate ester with a hydride source comprises contacting the mono-sulfonate ester with a first metal hydride and a second metal hydride.

Embodiment 35: The method of Embodiment 34, wherein the first metal hydride comprises an aluminum hydride or boron hydride reducing agent and the second metal hydride is an alkali metal hydride or an alkaline metal hydride.

Embodiment 36: The method of any of Embodiments 34-35, wherein the first metal hydride is $LiAlH_4$.

Embodiment 37: The method of any of Embodiments 34-35, wherein the first metal hydride is $LiBH_4$.

Embodiment 38: The method of any of Embodiments 34-37, wherein the second metal hydride is sodium hydride.

Embodiment 39: The method of any of Embodiments 29-38 wherein Z of Formula IV is an optionally substituted $C_{2-24}$ aliphatic group.

Embodiment 40: The method of any of Embodiments 29-39, wherein Z of Formula IV is $CH_3$.

Embodiment 41: The method of any of Embodiments 29-39, wherein Z of Formula IV is a group having the following formula:

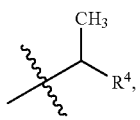

where $R^4$ is selected from the group consisting of: an optionally substituted $C_{1-40}$ aliphatic group; an optionally substituted $C_{1-40}$ carboxylic acid chain which may optionally be unsaturated at one or more positions; and an ester or orthoester derivative of an optionally substituted $C_{1-40}$ carboxylic acid chain which may optionally be unsaturated at one or more positions.

Embodiment 42: The method of any of Embodiments 29-39, wherein Z of Formula IV is

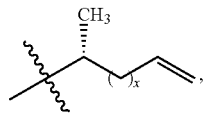

where x is an integer from 1 to 30.

Embodiment 43: The method of Embodiment 42, wherein Z of Formula IV is

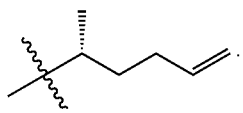 [SMILES: *[C@H](C)CCC=C]

Embodiment 44: The method of any of Embodiments 29-43, wherein treating the mono-sulfonate ester with a hydride source to form the 1-O-substituted ascarylose concomitantly reduces one or more functional groups on Z.

Embodiment 45: The method of any of Embodiments 29-44, further comprising isolating the 1-O-substituted ascarylose.

Embodiment 46: The method of Embodiment 45, wherein the 1-O-substituted ascarylose is isolated in at least 40% yield based on the feedstock.

Embodiment 47: The method of any of Embodiments 29-46, wherein the method is conducted using at least 1 kg of the feedstock.

Embodiment 48: The method of any of Embodiments 29-47, characterized in that a yield of the 1-O-substituted ascarylose is greater than 50%, greater than 60%, greater than 65%, greater than 70%, greater than 75%, greater than 70%, greater than 85%, or greater than 90%.

Embodiment 49: The method of any of Embodiments 29-48, characterized in that the method results in production of less than 40% of ring contracted rearrangement products, less than 30%, less than 25%, less than 20%, less than 15%, less than 10%, or less than 5% of ring contracted rearrangement products.

Embodiment 50: The method of any of Embodiments 29-49, further comprising a step of acylating the 2-OH and 4-OH hydroxyl groups of the 1-O-substituted ascarylose by adding an acylating reagent to a mixture resulting from the treatment of the feedstock with the hydride source and the strong base Embodiment 51: The method of Embodiment 50, wherein the acylating reagent is added to the mixture without a quenching step.

Embodiment 52: The method of Embodiment 50, wherein the acylating reagent is added to the mixture after a quenching step.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present disclosure will become apparent from the following.

Definitions

In order for the present disclosure to be more readily understood, certain terms are first defined below. Additional definitions for the following terms and other terms are set forth throughout the specification.

In this application, unless otherwise clear from context, the term "a" may be understood to mean "at least one." As used in this application, the term "or" may be understood to mean "and/or." In this application, the terms "comprising" and "including" may be understood to encompass itemized components or steps whether presented by themselves or together with one or more additional components or steps. As used in this application, the term "comprise" and variations of the term, such as "comprising" and "comprises," are not intended to exclude other additives, components, integers or steps.

About, Approximately: As used herein, the terms "about" and "approximately" are used as equivalents. Unless otherwise stated, the terms "about" and "approximately" may be understood to permit standard variation as would be understood by those of ordinary skill in the art. Where ranges are provided herein, the endpoints are included. Any numerals used in this application with or without about/approximately are meant to cover any normal fluctuations appreciated by one of ordinary skill in the relevant art. In some embodiments, the term "approximately" or "about" refers to a range of values that fall within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value).

Definitions of specific functional groups and chemical terms are described in more detail below. For purposes of this invention, the chemical elements are identified in accordance with the Periodic Table of the Elements, CAS version, Handbook of Chemistry and Physics, 75$^{th}$ Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March *March's Advanced Organic Chemistry*, 5$^{th}$ Edition, John Wiley & Sons, Inc., New York, 2001; Larock, *Comprehensive Organic Transformations*, VCH Publishers, Inc., New York, 1989; Carruthers, *Some Modern Methods of Organic Synthesis*, 3$^{rd}$ Edition, Cambridge University Press, Cambridge, 1987; the entire contents of each of which are incorporated herein by reference.

Certain compounds of the present invention can comprise one or more asymmetric centers, and thus can exist in various stereoisomeric forms, e.g., enantiomers and/or diastereomers. Thus, inventive compounds and compositions thereof may be in the form of an individual enantiomer, diastereomer or geometric isomer, or may be in the form of a mixture of stereoisomers. In certain embodiments, the compounds of the invention are enantiopure compounds. In certain other embodiments, mixtures of enantiomers or diastereomers are provided.

Furthermore, certain compounds, as described herein may have one or more double bonds that can exist as either a Z or E isomer, unless otherwise indicated. The invention additionally encompasses the compounds as individual isomers substantially free of other isomers and alternatively, as mixtures of various isomers, e.g., racemic mixtures of enantiomers. In addition to the above-mentioned compounds per se, this invention also encompasses compositions comprising one or more compounds.

As used herein, the term "isomers" includes any and all geometric isomers and stereoisomers. For example, "isomers" include cis- and trans-isomers, E- and Z-isomers, R- and S-enantiomers, diastereomers, (D)-isomers, (L)-isomers, racemic mixtures thereof, and other mixtures thereof, as falling within the scope of the invention. For instance, a compound may, in some embodiments, be provided substantially free of one or more corresponding stereoisomers, and may also be referred to as "stereochemically enriched."

Where a particular enantiomer is preferred, it may, in some embodiments be provided substantially free of the opposite enantiomer, and may also be referred to as "optically enriched." "Optically enriched," as used herein, means that the compound is made up of a significantly greater proportion of one enantiomer. In certain embodiments the compound is made up of at least about 90% by weight of an enantiomer. In some embodiments the compound is made up of at least about 95%, 97%, 98%, 99%, 99.5%, 99.7%, 99.8%, or 99.9% by weight of an enantiomer. In some embodiments the enantiomeric excess of provided compounds is at least about 90%, 95%, 97%, 98%, 99%, 99.5%, 99.7%, 99.8%, or 99.9%. In some embodiments, enantiomers may be isolated from racemic mixtures by any method known to those skilled in the art, including chiral high pressure liquid chromatography (HPLC) and the formation and crystallization of chiral salts or prepared by asymmetric syntheses. See, for example, Jacques, et al., *Enantiomers, Racemates and Resolutions* (Wiley Interscience, New York, 1981); Wilen, S. H., et al., *Tetrahedron* 33:2725 (1977); Eliel, E. L. *Stereochemistry of Carbon Compounds* (McGraw-Hill, NY, 1962); Wilen, S. H. *Tables of Resolving Agents and Optical Resolutions* p. 268 (E. L. Eliel, Ed., Univ. of Notre Dame Press, Notre Dame, IN 1972).

The terms "halo" and "halogen" as used herein refer to an atom selected from fluorine (fluoro, —F), chlorine (chloro, —Cl), bromine (bromo, —Br), and iodine (iodo, —I).

The term "aliphatic" or "aliphatic group", as used herein, denotes a hydrocarbon moiety that may be straight-chain (i.e., unbranched), branched, or cyclic (including fused, bridging, and spiro-fused polycyclic) and may be completely saturated or may contain one or more units of unsaturation, but which is not aromatic. Unless otherwise specified, aliphatic groups contain 1-30 carbon atoms. In certain embodiments, aliphatic groups contain 1-12 carbon atoms. In certain embodiments, aliphatic groups contain 1-8 carbon atoms. In certain embodiments, aliphatic groups contain 1-6 carbon atoms. In some embodiments, aliphatic groups contain 1-5 carbon atoms, in some embodiments, aliphatic groups contain 1-4 carbon atoms, in yet other embodiments aliphatic groups contain 1-3 carbon atoms, and in yet other embodiments aliphatic groups contain 1-2 carbon atoms. Suitable aliphatic groups include, but are not limited to, linear or branched, alkyl, alkenyl, and alkynyl groups, and hybrids thereof such as (cycloalkyl)alkyl, (cycloalkenyl)alkyl or (cycloalkyl)alkenyl.

The term "heteroaliphatic" or "heteroaliphatic group", as used herein, denotes an aliphatic group where one or more carbon or hydrogen atoms are replaced by a heteroatom (e.g. oxygen, nitrogen, sulfur, phosphorous, boron, etc.).

The term "unsaturated", as used herein, means that a moiety has one or more double or triple bonds.

The term "alkyl," as used herein, refers to saturated, straight- or branched-chain hydrocarbon radicals derived from an aliphatic moiety containing between one and six carbon atoms by removal of a single hydrogen atom. Unless otherwise specified, alkyl groups contain 1-12 carbon atoms. In certain embodiments, alkyl groups contain 1-8 carbon atoms. In certain embodiments, alkyl groups contain 1-6 carbon atoms. In some embodiments, alkyl groups contain 1-5 carbon atoms, in some embodiments, alkyl groups contain 1-4 carbon atoms, in yet other embodiments alkyl groups contain 1-3 carbon atoms, and in yet other embodiments alkyl groups contain 1-2 carbon atoms. Examples of alkyl radicals include, but are not limited to, methyl, ethyl, n-propyl, isopropyl, n-butyl, iso-butyl, sec-butyl, sec-pentyl, iso-pentyl, tert-butyl, n-pentyl, neopentyl, n-hexyl, sec-hexyl, n-heptyl, n-octyl, n-decyl, n-undecyl, dodecyl, and the like.

The term "alkenyl," as used herein, denotes a monovalent group derived from a straight- or branched-chain aliphatic moiety having at least one carbon-carbon double bond by the removal of a single hydrogen atom. Unless otherwise specified, alkenyl groups contain 2-12 carbon atoms. In certain embodiments, alkenyl groups contain 2-8 carbon atoms. In certain embodiments, alkenyl groups contain 2-6 carbon atoms. In some embodiments, alkenyl groups contain 2-5 carbon atoms, in some embodiments, alkenyl groups contain 2-4 carbon atoms, in yet other embodiments alkenyl groups contain 2-3 carbon atoms, and in yet other embodiments alkenyl groups contain 2 carbon atoms. Alkenyl groups include, for example, ethenyl, propenyl, butenyl, 1-methyl-2-buten-1-yl, and the like.

The term "aryl" used alone or as part of a larger moiety as in "aralkyl", "aralkoxy", or "aryloxyalkyl", refers to monocyclic and polycyclic ring systems having a total of five to 20 ring members, wherein at least one ring in the system is aromatic and wherein each ring in the system contains three to twelve ring members. The term "aryl" may be used interchangeably with the term "aryl ring". In certain embodiments of the present invention, "aryl" refers to an aromatic ring system which includes, but is not limited to, phenyl, biphenyl, naphthyl, anthracyl and the like, which may bear one or more substituents. Also included within the scope of the term "aryl", as it is used herein, is a group in which an aromatic ring is fused to one or more additional rings, such as benzofuranyl, indanyl, phthalimidyl, naphthimidyl, phenantriidinyl, or tetrahydronaphthyl, and the like.

As described herein, compounds of the invention may contain "optionally substituted" moieties. In general, the term "substituted", whether preceded by the term "optionally" or not, means that one or more hydrogens of the designated moiety are replaced with a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned by this invention are preferably those that result in the formation of stable or chemically feasible compounds. The term "stable", as used herein, refers to compounds that are not substantially altered when subjected to conditions to allow for their production, detection, and, in certain embodiments, their recovery, purification, and use for one or more of the purposes disclosed herein.

Suitable monovalent substituents on a substitutable carbon atom of an "optionally substituted" group are independently halogen; —$(CH_2)_{0-4}R°$; —$(CH_2)_{0-4}OR°$; —O—$(CH_2)_{0-4}C(O)OR°$; —$(CH_2)_{0-4}CH(OR°)_2$; —$(CH_2)_{0-4}SR°$; —$(CH_2)_{0-4}Ph$, which may be substituted with $R°$; —$(CH_2)_{0-4}O(CH_2)_{0-1}Ph$ which may be substituted with $R°$; —CH=CHPh, which may be substituted with $R°$; —$NO_2$; —CN; —$N_3$; —$(CH_2)_{0-4}N(R°)_2$; —$(CH_2)_{0-4}N(R°)C(O)R°$; —$N(R°)C(S)R°$; —$(CH_2)_{0-4}N(R°)C(O)NR°_2$; —$N(R°)C(S)NR°_2$; —$(CH_2)_{0-4}N(R°)C(O)OR°$; —$N(R°)N(R°)C(O)R°$; —$N(R°)N(R°)C(O)NR°_2$; —$N(R°)N(R°)C(O)OR°$; —$(CH_2)_{0-4}C(O)R°$; —$C(S)R°$; —$(CH_2)_{0-4}C(O)OR°$; —$(CH_2)_{0-4}C(O)N(R°)_2$; —$(CH_2)_{0-4}C(O)SR°$; —$(CH_2)_{0-4}C(O)OSiR°_3$; —$(CH_2)_{0-4}OC(O)R°$; —$OC(O)(CH_2)_{0-4}SR$—, $SC(S)SR°$; —$(CH_2)_{0-4}SC(O)R°$; —$(CH_2)_{0-4}C(O)NR°_2$; —$C(S)NR°_2$; —$C(S)SR°$; —$SC(S)SR°$, —$(CH_2)_{0-4}OC(O)NR°_2$; —$C(O)N(OR°)R°$; —$C(O)C(O)R°$; —$C(O)CH_2C(O)R°$; —$C(NOR°)R°$; —$(CH_2)_{0-4}SSR°$; —$(CH_2)_{0-4}S(O)_2R°$; —$(CH_2)_{0-4}S(O)_2OR°$; —$(CH_2)_{0-4}OS(O)_2R°$; —$S(O)_2NR°_2$; —$(CH_2)_{0-4}S(O)R°$; —$N(R°)S(O)_2NR°_2$; —$N(R°)S(O)_2R°$; —$N(OR°)R°$; —$C(NH)NR°_2$; —$P(O)_2R°$; —$P(O)R°_2$; —$OP(O)R°_2$; —$OP(O)(OR°)_2$; $SiR°_3$; —$(C_{1-4}$ straight or branched alkylene)O—$N(R°)_2$; or —$(C_{1-4}$ straight or branched alkylene)C(O)O—$N(R°)_2$, wherein each $R°$ may be substituted as defined below and is independently hydrogen, $C_{1-8}$ aliphatic, —$CH_2Ph$, —$O(CH_2)_{0-1}Ph$, or a 5-6-membered saturated, partially unsaturated, or aryl ring having 0-4 heteroatoms independently selected from nitrogen, oxygen, or sulfur, or, notwithstanding the definition above, two independent occurrences of $R°$, taken together with their intervening atom(s), form a 3-12-membered saturated, partially unsaturated, or aryl mono- or polycyclic ring having 0-4 heteroatoms independently selected from nitrogen, oxygen, or sulfur, which may be substituted as defined below.

Suitable monovalent substituents on $R°$ (or the ring formed by taking two independent occurrences of $R°$ together with their intervening atoms), are independently halogen, —$(CH_2)_{0-2}R^●$, -(halo$R^●$), —$(CH_2)_{0-2}OH$, —$(CH_2)_{0-2}OR^●$, —$(CH_2)_{0-2}CH(OR^●)_2$; —O(halo$R^●$), —CN, —$N_3$, —$(CH_2)_{0-2}C(O)R^●$, —$(CH_2)_{0-2}C(O)OH$, —$(CH_2)_{0-2}C(O)OR^●$, —$(CH_2)_{0-4}C(O)N(R°)_2$; —$(CH_2)_{0-2}SR^●$, —$(CH_2)_{0-2}SH$, —$(CH_2)_{0-2}NH_2$, —$(CH_2)_{0-2}NHR^●$, —$(CH_2)_{0-2}NR^●_2$, —$NO_2$, —$SiR^●_3$, —$OSiR^●_3$, —$C(O)SR^●$, —$(C_{1-4}$ straight or branched alkylene)C(O)O$R^●$, or —$SSR^●$ wherein each $R^●$ is unsubstituted or where preceded by "halo" is substituted only with one or more halogens, and is independently selected from $C_{1-4}$ aliphatic, —$CH_2Ph$, —$O(CH_2)_{0-1}Ph$, or a 5-6-membered saturated, partially unsaturated, or aryl ring having 0-4 heteroatoms independently selected from nitrogen, oxygen, or sulfur. Suitable divalent substituents on a saturated carbon atom of $R°$ include =O and =S.

Suitable divalent substituents on a saturated carbon atom of an "optionally substituted" group include the following: =O, =S, =NNR*$_2$, =NNHC(O)R*, =NNHC(O)OR*, =NNHS(O)$_2$R*, =NR*, =NOR*, —O(C(R*$_2$))$_{2-3}$O—, or —S(C(R*$_2$))$_{2-3}$S—, wherein each independent occurrence of R* is selected from hydrogen, $C_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur. Suitable divalent substituents that are bound to vicinal substitutable carbons of an "optionally substituted" group include: —O(CR*$_2$)$_{2-3}$O—, wherein each independent occurrence of R* is selected from hydrogen, $C_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur.

Suitable substituents on the aliphatic group of R* include halogen, —$R^●$, -(halo$R^●$), —OH, —$OR^●$, —O(halo$R^●$), —CN, —C(O)OH, —C(O)O$R^●$, —$NH_2$, —$NHR^●$, —$NR^●_2$, or —$NO_2$, wherein each $R^●$ is unsubstituted or where preceded by "halo" is substituted only with one or more halogens, and is independently $C_{1-4}$ aliphatic, —$CH_2Ph$, —$O(CH_2)_{0-1}Ph$, or a 5-6-membered saturated, partially unsaturated, or aryl ring having 0-4 heteroatoms independently selected from nitrogen, oxygen, or sulfur.

Suitable substituents on a substitutable nitrogen of an "optionally substituted" group include —$R^†$, —$NR^†_2$, —C(O)$R^†$, —C(O)O$R^†$, —C(O)C(O)$R^†$, —C(O)$CH_2C(O)R^†$, —$S(O)_2R^†$, —$S(O)_2NR^†_2$, —$C(S)NR^†_2$, —$C(NH)NR^†_2$, or —$N(R^†)S(O)_2R^†$; wherein each $R^†$ is independently hydrogen, $C_{1-6}$ aliphatic which may be substituted as defined below, unsubstituted —OPh, or an unsubstituted 5-6-membered saturated, partially unsaturated, or aryl ring having 0-4 heteroatoms independently selected from nitrogen, oxygen, or sulfur, or, notwithstanding the definition above, two independent occurrences of Rt, taken together with their intervening atom(s) form an unsubstituted 3-12-membered saturated, partially unsaturated, or aryl mono- or bicyclic ring having 0-4 heteroatoms independently selected from nitrogen, oxygen, or sulfur.

Suitable substituents on the aliphatic group of Rt are independently halogen, —$R^●$, -(halo$R^●$), —OH, —$OR^●$, —O(halo$R^●$), —CN, —C(O)OH, —C(O)O$R^●$, —$NH_2$, —$NHR^●$, —$NR^●_2$, or —$NO_2$, wherein each $R^●$ is unsubstituted or where preceded by "halo" is substituted only with one or more halogens, and is independently $C_{1-4}$ aliphatic, —$CH_2Ph$, —$O(CH_2)_{0-1}Ph$, or a 5-6-membered saturated, partially unsaturated, or aryl ring having 0-4 heteroatoms independently selected from nitrogen, oxygen, or sulfur.

As used herein, the term "Substantially" refers to the qualitative condition of exhibiting total or near-total extent or degree of a characteristic or property of interest.

BRIEF DESCRIPTION OF THE DRAWING

In the drawing, like reference characters generally refer to the same parts throughout the different views. Also, the drawing is not necessarily to scale, emphasis instead generally being placed upon illustrating the principles of the disclosed compositions and methods and is not intended as limiting. For purposes of clarity, not every component may be labeled in the drawing. In the following description, various embodiments are described with reference to the following drawing, in which: FIG. 1 shows the $^1$H NMR spectrum of a representative product produced by one embodiment of the methods disclosed herein.

DETAILED DESCRIPTION OF THE INVENTION

In one aspect, the present invention provides methods for converting 1-O-substituted rhamnose to 1-O-substituted ascarylose comprising:
  providing as a feedstock a 1-O-substituted rhamnose;
  forming a mono-sulfonate ester at the 3-OH group of the feedstock; and
  treating the mono-sulfonate ester with a hydride source to form a 1-O-substituted ascarylose. In certain embodiments, forming the mono-sulfonate ester is conducted on a substrate without hydroxyl protecting groups at the 2- or 4-position of the rhamnose feedstock. In certain embodiments, such methods comprise contacting the feedstock with a sulfonating agent (i.e., a sulfonyl halide, sulfonic anhydride or similar reagent) in the presence of a Lewis acid.

In certain embodiments, the Lewis acid comprises a tin compound. In certain embodiments, the Lewis acid comprises a tin compound having a formula: $R^1R^2SnX_2$, wherein $R^1$ and $R^2$ are each independently selected from the group consisting of $C_{1-40}$ aliphatic, $C_{1-40}$ heteroaliphatic, optionally substituted aromatic, and optionally substituted heteroaromatic, where $R^1$ and $R^2$ may optionally be taken together to form an optionally substituted ring; and each X is independently selected from halogen, and $OR^3$, or where both X are taken together to form a carbonyl, where each $R^3$ is independently selected from the group consisting of: $C_{1-40}$ aliphatic; $C_{1-40}$ acyl and optionally substituted aromatic or, when two —$OR^3$ groups are present the $R^3$ groups are taken together to form an optionally substituted ring.

In certain embodiments, $R^1$ and $R^2$ are each independently $C_{1-20}$ aliphatic, $C_{2-12}$ aliphatic, $C_{2-8}$ aliphatic, $C_{1-6}$ aliphatic, or $C_{1-4}$ aliphatic. In certain embodiments $R^1$ and $R^2$ are the same. In certain embodiments, $R^1$ and $R^2$ are independently selected from methyl, ethyl, n-propyl, i-propyl, n-butyl, i-butyl, n-pentyl, cyclopentyl, n-hexyl, cyclohexyl, n-octyl, and $C_{9-24}$ straight chain alkyl. In certain embodiments, $R^1=R^2$=n-butyl. In certain embodiments, $R^1=R^2$=n-octyl.

In certain embodiments, each X is a halogen atom. In certain embodiments, each X is chlorine. In certain embodiments, each X is an alkoxide, in certain embodiments, such alkoxides are $C_{1-8}$ straight chain alkoxides. In certain embodiments, each X is independently selected from the group consisting of methoxide, ethoxide, n-propoxide, i-propoxide, n-butoxide and, i-butoxide. In certain embodiments, each X is an acyl group, in certain embodiments, such acyl groups are $C_{1-16}$ straight or branched acyl groups. In certain embodiments, each X is independently selected from the group consisting of acetate, propionate, butanoate, ethylhexanoate, octanoate, or long chain fatty acyl groups.

In certain embodiments, the Lewis acid comprises a dialkyl tin dihalide. In certain embodiments, the Lewis acid comprises $R^1R^2SnCl_2$, where $R^1$ and $R^2$ are as defined above and in the genera and subgenera herein. In certain embodiments, the Lewis acid comprises $(R^1)_2SnCl_2$, (i.e., $R^1=R^2$). In certain embodiments, the Lewis acid comprises $(R^1)_2SnCl_2$ where $R^1$ is an alkyl group. In certain embodiments, the Lewis acid comprises dibutyl tin dichloride.

In certain embodiments, the Lewis acid comprises a boron-compound. Suitable boron compounds include, but are not limited to boron halides such as $BF_3$ and its complexes, alkyl boron compounds, boronates and similar boronic acid derivatives, amino-boranes, boron complexes of amino alcohols and other nitrogen-boron complexes and combinations of any of these.

In certain embodiments, the Lewis acid is used in catalytic amounts (i.e., in amounts less than 1 molar equivalent with respect to the rhamnose feedstock). In certain embodiments, the Lewis acid is present at a molar ratio of less than 1:2, less than 1:5, less than 1:10, less than 1:20, less than 1:50, less than 1:100, less than 1:200, less than 1:500, or less than 1:1000 relative to the 1-O-substituted rhamnose. In certain embodiments, the Lewis acid is present at a ratio between about 1:10 and about 1:200 relative to the 1-O-substituted rhamnose. In certain embodiments, the Lewis acid is present at a ratio between about 1:50 and about 1:100, between about 1:100 and 1:400 or between about 1:200 and 1:500 relative to the 1-O-substituted rhamnose. In certain embodiments, the Lewis acid is present at a ratio of about 1:100 relative to the 1-O-substituted rhamnose. In certain embodiments, the Lewis acid is present at a ratio of about 1:200 relative to the 1-O-substituted rhamnose.

In certain embodiments, sulfonating the 1-O-substituted rhamnose includes treatment with a base. In certain embodiments, the base is an organic base such as a nitrogen-containing heterocycle, or a trialkyl amine. In certain embodiments, the base is an inorganic base, such as a metal hydroxide, carbonate, or hydride. In certain embodiments, the base comprises an amine. In certain embodiments, the base comprises Hünig's base (diisopropylethyl amine). In certain embodiments, the base comprises triethyl amine. In certain embodiments, the base comprises an alkali metal salt. In certain embodiments, the base comprises an alkali metal hydroxide or an alkali metal carbonate. In certain embodiments, the base comprises sodium hydroxide, sodium carbonate, potassium hydroxide, potassium carbonate, lithium hydroxide, lithium carbonate or a combination of two or more of these.

The identity of the sulfonate ester that is formed at the 3-position is not particularly limited. In certain embodiments, the sulfonate ester comprises p-toluene sulfonate. In certain embodiments, the sulfonate ester comprises methyl sulfonate. In certain embodiments, the sulfonate ester comprises trifluoromethyl sulfonate. In addition to these, the sulfonate ester can comprise any of a large number of other sulfonate esters known in the art and frequently employed to activate alcohols to nucleophilic displacement. It is within the ability of the skilled artisan to choose which sulfonate ester is employed and the commercial availability of a wide variety of sulfonating reagents makes it straightforward for the artisan to test various sulfonate esters according to the methods herein and to choose those that provide the best results and/or lowest cost.

Rhamnose (methyloxane-2,3,4,5-tetrol) is a sugar, the structure of which is shown below as Formula I. By "1-O-substituted rhamnose" is meant a rhamnose with a non-H substituent in the place of the hydrogen on the OH group at the 1-position (i.e., in place of H of the "1-OH" of Formula I). Rhamnose (and, correspondingly, 1-O-substituted rhamnose) can be provided in its L-form or its D-form. In certain embodiments, the methods provided herein relate to rhamnose (and 1-O-substituted rhamnose) in its L-form (which is its naturally occurring form).

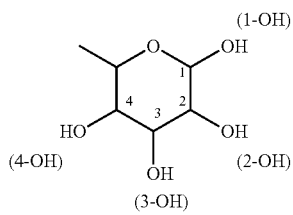

Formula I

The 1-O substituted rhamnose is depicted below as Formula II, where Z represents the "1-OH substituent."

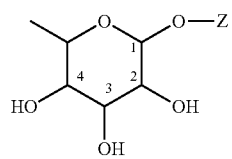

Formula II

The present invention places no particular limits on the identity of the substituent ("Z") replacing the hydrogen at the 1-OH of the rhamnose feedstock. Preferably, the substituent does not contain any functional groups or features that interfere with the reagents and reaction conditions utilized in the inventive deoxygenation processes. In certain embodiments, the 1-OH substituent (i.e., "Z") is a hydroxyl protecting group. Suitable hydroxyl protecting groups are well known in the art and include, for example, those described in the reference book, *Protecting Groups in Organic Synthesis*, Peter G. M. Wuts, editor ISBN: 9781118057483, the entirety of which is hereby incorporated herein by reference. In certain embodiments, where the ascarylose is to be converted further to a final product having 1-O-substitution, it may be desirable and efficient to utilize a rhamnose feedstock having a substituent on the 1-OH position that is identical to the desired substituent of the target ascarylose (or an enantiomer or isomer thereof), or which is a convenient synthetic precursor to the desired substituent. In certain embodiments, the substituent is the sidechain of a naturally occurring ascaroside. In certain embodiments, the substituent has a structure:

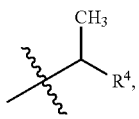

where $R^4$, is an optionally substituted $C_{1-40}$ aliphatic group. In certain embodiments, $R^4$, is a $C_{1-40}$ carboxylic acid chain which may optionally be unsaturated at one or more positions or an ester or orthoester derivative of such a carboxylic acid. In certain embodiments, $R^4$, is a $C_{1-40}$ alpha olefin. In certain embodiments, the substituent has a structure:

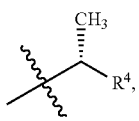

where $R^4$ is as defined above and in the genera and subgenera herein. In certain embodiments, the substituent is a $C_{1-40}$ carboxylic acid chain that has a structure:

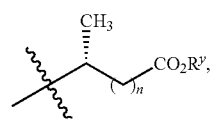

where n is an integer from 1 to 40; and $R^Y$ is selected from the group consisting of: —H, a metal cation, a carboxyl protecting group, an optionally substituted $C_{1-20}$ aliphatic group, an optionally substituted aromatic group, or is a biomolecule residue such as a glycoside, an amino acid, a peptide, a nucleotide, or a derivative of any of these. In certain embodiments, the substituent is an ester or orthoester derivative of a $C_{1-40}$ carboxylic acid chain that has a structure:

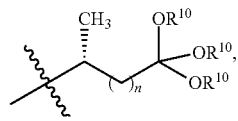

where n is an integer from 1 to 40; and $R^{10}$ is selected from the group consisting of: an optionally substituted $C_{1-20}$ aliphatic group, and an optionally substituted aromatic group. In certain embodiments, the substituent is an ester or orthoester derivative of a $C_{1-40}$ carboxylic acid chain that has a structure:

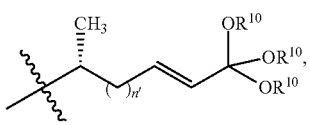

where n' is an integer from 1 to 38; and $R^{10}$ is selected from the group consisting of: an optionally substituted $C_{1-20}$ aliphatic group, and an optionally substituted aromatic group. In certain embodiments, the substituent has a structure:

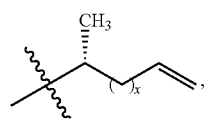

where x is an integer from 1 to 30.

In other embodiments of the invention, it may be desirable to utilize a rhamnose feedstock having a Z substituent on the 1-OH position that functions as a protecting group and which can be removed to provide unsubstituted ascarylose or to allow substitution at the 1-OH position with another substituent (e.g. with the sidechain of an ascaroside or similar ascarylose-containing natural product or derivative). Suitable protecting groups can be found in *Protecting Groups in Organic Synthesis*, Peter G. M. Wuts, editor ISBN:9781118057483. In certain embodiments, the 1-OH substituent is an alkyl group. In certain embodiments, the 1-OH substituent is a methyl group.

The disclosed methods can begin with direct reaction of the 1-O-substituted rhamnose or can comprise a first step of converting rhamnose to the 1-O-substituted rhamnose. Methods of converting OH to O—Z, providing the 1-O-substituted rhamnose are dependent upon the Z substituent, and are generally known in the art.

Ascarylose can be depicted according to Formula III, below.

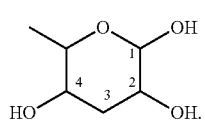

Formula III

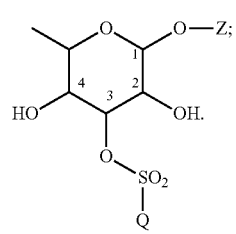

Formula IV

As noted above, in some embodiments, the disclosed method provides a 1-O-substituted ascarylose, according to Formula V below. In some embodiments, the method further comprises reacting the 1-O-substituted ascarylose (e.g., including, but not limited to, removing Z where Z is a protecting group (affording, e.g., ascarylose), and optionally further functionalizing the ascarylose at that 1-OH position to provide a modified ascarylose).

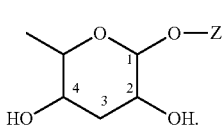

Formula V

The processes herein disclosed for treating the rhamnose-derived mono-sulfonate ester with a hydride source to form a 1-O-substituted ascarylose are unexpectedly facile and high yielding. The feasibility of this step is particularly surprising in view of prior art reports that the treatment of such mono-tosylates frequently leads to rearrangement of the sugar to a five-membered ring. For example Baer et al. reported in the *Canadian Journal of Chemistry* (1985, vol. 63, p. 432, DOI: 10.1139/v85-072) that treatment of the 2-para toluene sulfonate ester of the same substrate leads to rearrangement as shown below.

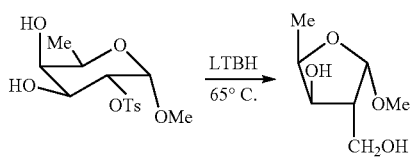

Similarly, Ito et al. reported that hydride reductions of closely related sulfonated sugars provides only poor yields of the corresponding deoxy sugars due to preference for ring contraction or O—S bond cleavage rather than the desired reductive removal of the tosyloxy group (Chemical and Pharmaceutical Bulletin, 1991, Volume 39, Issue 8, Pages 1983-1989). Likewise, Binkley (J. Org. Chem. 50, 5646 (1985)) reports that hydride treatment of similar substrates having more than one sulfonate ester yields complex mixtures of products including substantial amounts of ring-contracted products. In contrast, the inventors herein provide a method that unexpectedly results in high yields of the desired 3-deoxy product without extensive rearrangement.

As such, in one aspect, the present invention provides processes for the synthesis of 3-deoxy rhamnose and its derivatives comprising a high yielding reductive cleavage of a 3-sulfonate ester derivative of rhamnose. In certain embodiments such methods comprise providing, as a feedstock, the 3-sulfonate ester of a 1-O-substituted rhamnose having the structure of Formula IV, wherein Z is as defined above and in the genera and subgenera herein and Q is an optionally substituted aliphatic or aromatic moiety:

and treating the mono-sulfonate ester with the combination of a strong base and a hydride source to form a 1-O-substituted ascarylose.

In certain embodiments, Q comprises an optionally substituted aliphatic group. In certain embodiments, Q is selected from methyl, ethyl, $C_{3-8}$ alkyl, —$CF_3$, or $C_{3-8}$ fluoroalkyl. In certain embodiments, Q is methyl. In certain embodiments, Q comprises an optionally substituted aryl group. In certain embodiments, Q is selected from phenyl, p-toluyl, m-toluyl, o-toluyl, bromophenyl, methoxyphenyl and nitrophenyl. In certain embodiments, Q is p-toluyl.

In certain embodiments, provided methods are characterized in that the hydride treatment provides yields of the 3-deoxy product of greater than 50% (based on the starting 3-sulfonate ester of the 1-O-substituted rhamnose feedstock). In certain embodiments, the methods are characterized in that the hydride treatment provides yields of the 3-deoxy product of greater than 30%, greater than 40%, greater than 50%, greater than 60%, greater than 65%, greater than 70%, greater than 75%, greater than 70%, greater than 85%, or greater than 90%. In certain embodiments, the methods are characterized in that the hydride treatment results in production of less than 40% of ring contracted rearrangement products. In certain embodiments, the methods are characterized in that the hydride treatment results in production of less than 30%, less than 25%, less than 20%, less than 15%, less than 10%, or less than 5% of ring contracted rearrangement products.

In certain embodiments, treating the mono-sulfonate ester with a hydride source comprises contacting the mono-sulfonate ester with an aluminum hydride compound. In certain embodiments, the hydride source comprises $LiAlH_4$. In certain embodiments, the hydride source comprises diisobutyl aluminum hydride. In certain embodiments, treating the mono-sulfonate ester with a hydride source comprises contacting the mono-sulfonate ester with a boron hydride compound. In certain embodiments, the hydride source comprises $NaBH_4$. In certain embodiments, the hydride source comprises $LiBH_4$. In certain embodiments, the hydride source comprises an alkyl boron hydride. In certain embodiments, the hydride source comprises lithium triethylborohydride.

In certain embodiments, treating the mono-sulfonate ester with a hydride source comprises contacting the mono-sulfonate ester with the hydride source in the presence of a strong base. In certain embodiments, the strong base comprises an alkali metal hydride; in certain embodiments, the strong base comprises sodium hydride. In certain embodiments, the strong base comprises an alkaline metal hydride; in certain embodiments, the strong base comprises calcium hydride. In certain embodiments, the strong base comprises an alkali metal oxide or alkoxide. In certain embodiments, the strong base comprises a potassium alkoxide. In certain embodiments, the strong base comprises a sodium alkoxide. In certain embodiments, the strong base comprises a potassium tert-butoxide. In certain embodiments, the strong base comprises a sodium tert-butoxide. In certain embodiments, the strong base comprises a nitrogen anion. In certain embodiments, a strong base comprising a nitrogen anion comprises an alkali metal amide (e.g. such as sodium diisopropyl amide or potassium bis(trimethylsilyl)amide).

In certain embodiments, the strong base comprises a sodium ion. In certain embodiments, the strong base comprises a potassium ion. In certain embodiments, the strong base comprises a rubidium or cesium ion. In certain embodiments, the strong base is not a lithium salt. In certain embodiments, the strong base is not an aluminum salt.

In certain embodiments, the strong base is added as a solid. In certain embodiments, the strong base is added as a solution in an organic solvent. In certain embodiments, the strong base is added as a suspension.

In certain embodiments, provided methods comprise treating the mono-sulfonate ester with a combination of an aluminum hydride compound and a strong base. In certain embodiments, the provided methods comprise treating the mono-sulfonate ester with a combination of an aluminum hydride compound and an alkali metal hydride or alkaline metal hydride. In certain embodiments, the provided methods comprise treating the mono-sulfonate ester with a combination of lithium aluminum hydride and an alkali metal hydride. In certain embodiments, the provided methods comprise treating the mono-sulfonate ester with a combination of lithium aluminum hydride and sodium hydride. In certain embodiments, the provided methods comprise treating the mono-sulfonate ester with a combination of lithium aluminum hydride and an alkaline metal hydride. In certain embodiments, provided methods comprise treating the mono-sulfonate ester with the combination of lithium aluminum hydride and calcium hydride.

In certain embodiments, the provided methods comprise treating the mono-sulfonate ester with a combination of an aluminum hydride compound and an alkali metal oxide or alkoxide. In certain embodiments, the provided methods comprise treating the mono-sulfonate ester with the combination of lithium aluminum hydride and an alkali metal hydroxide. In certain embodiments, the provided methods comprise treating the mono-sulfonate ester with a combination of lithium aluminum hydride and a sodium alkoxide. In certain embodiments, the provided methods comprise treating the mono-sulfonate ester with a combination of lithium aluminum hydride and a potassium alkoxide. In certain embodiments, the provided methods comprise treating the mono-sulfonate ester with a combination of lithium aluminum hydride and potassium tert-butoxide. In certain embodiments, the provided methods comprise treating the mono-sulfonate ester with a combination of lithium aluminum hydride and sodium tert-butoxide.

In certain embodiments, the provided methods comprise treating the mono-sulfonate ester with a combination of a boron hydride compound and a strong base. In certain embodiments, the provided methods comprise treating the mono-sulfonate ester with a combination of a boron hydride compound and an alkali metal hydride or alkaline metal hydride. In certain embodiments, the provided methods comprise treating the mono-sulfonate ester with a combination of sodium borohydride or lithium borohydride and an alkali metal hydride. In certain embodiments, the provided methods comprise treating the mono-sulfonate ester with a combination of sodium borohydride or lithium borohydride and sodium hydride. In certain embodiments, the provided methods comprise treating the mono-sulfonate ester with a combination of sodium borohydride or lithium borohydride and an alkaline metal hydride. In certain embodiments, the provided methods comprise treating the mono-sulfonate ester with a combination of sodium borohydride or lithium borohydride and calcium hydride.

In certain embodiments, the provided methods comprise treating the mono-sulfonate ester with a combination of a boron hydride compound and an alkali metal oxide or alkoxide. In certain embodiments, the provided methods comprise treating the mono-sulfonate ester with a combination of sodium borohydride or lithium borohydride and an alkali metal alkoxide. In certain embodiments, the provided methods comprise treating the mono-sulfonate ester with a combination of sodium borohydride or lithium borohydride and sodium tert-butoxide. In certain embodiments, the provided methods comprise treating the mono-sulfonate ester with a combination of sodium borohydride or lithium borohydride and potassium tert-butoxide.

No particular limits are placed on the amount of strong base present in the hydride reduction step. In certain embodiments, the strong base is provided in approximately equimolar amounts to the mono-sulfonate ester substrate. In certain embodiments, the strong base is provided in approximately molar excess relative to the mono-sulfonate ester substrate. In certain embodiments, the strong base is provided in approximately equimolar amounts to the hydride reducing agent. In certain embodiments, the strong base is provided in an equimolar or higher ratio relative to the free —OH groups present on the the mono-sulfonate ester substrate. In certain embodiments, the base is provided in an approximately equimolar ratio to free —OH groups present on the substrate.

In one aspect, the present invention provides a method for conversion of 1-O-methyl rhamnose to 1-O-methyl ascarylose. In certain embodiments, the method comprises contacting 1-O-methyl rhamnose with a sulfonating agent in the presence of a Lewis acid catalyst to selectively sulfonate the 3-OH group of the 1-O-methyl rhamnose and then treating the mono-sulfonate ester with a hydride source to provide 1-O-methyl ascarylose in a yield greater than 50%. In certain embodiments, the Lewis acid is a tin compound such as a dialkyl tin dihalide. In certain embodiments, the Lewis acid is a dialkyl tin dichloride such as dibutyl tin dichloride. In certain embodiments, the sulfonating agent used comprises a sulfonyl chloride such as p-toluene sulfonyl chloride. In certain embodiments, the hydride source comprises an aluminum hydride reducing agent such as lithium aluminum hydride. In certain embodiments, treating the mono-sulfonate ester with a hydride reducing agent includes contacting the mono-sulfonate ester with a strong base such as an alkali metal hydride, an alkaline metal hydride (e.g. such as NaH or $CaH_2$), or an alkali metal oxide or alkoxide. In certain embodiments, treating the mono-sulfonate ester with a hydride reducing agent comprises first adding to the mono-sulfonate ester substrate, at least one molar equivalent of a strong base and thereafter treating the substrate with at least one molar equivalent of the hydride reducing agent. In certain embodiments, treating the mono-sulfonate ester with a hydride reducing agent comprises first adding to the mono-sulfonate ester substrate a strong base in an amount that is equal to or greater than the molar equivalents of free —OH groups present on the substrate, and thereafter treating the mixture with at least one molar equivalent of the hydride reducing agent.

In certain embodiments, the methods are characterized in that purification by chromatography is unnecessary to obtain substantially pure product. As used herein, the term "substantially pure" refers to a product that has a purity of about 85% or greater, about 88% or greater, about 90% or greater, about 95% or greater, about 98% or greater, about 99% or greater, or about 99.5% or greater. In certain embodiments, purification of the 1-O-methyl ascarylose is facilitated by substitution of the 2- and 4-hydroxyl groups with substituents that render the product hydrophobic. Such hydrophobic derivatives can be purified, e.g., by extraction into a nonpolar organic solvent. Therefore, in certain embodiments, the provided methods comprise the additional step of treating the product obtained from the hydride reduction to install substituents on the 2- and 4-hydroxyl groups. In certain embodiments, it is convenient if such substituents are cleavable, such that the 2-4- —OH compound can be regenerated if desired (e.g., following purification). Such substitution of the 2- and 4-hydroxyl groups may also enable manipulation of the 1-O-substituent (e.g., removal and replacement of the 1-O-substituent of the product 1-O-substituted ascarylose) or manipulation of the 1-O-substituent (e.g. via carbon-carbon bond forming reactions or functional group manipulations of the substituent). In certain embodiments, these additional steps enable methods to produce valuable ascarylose derivatives such as ascaroside natural products like ascr #18 or ascr #7, which may have utility in agriculture or human health applications. (See, e.g., von Reuss et al., "Comparative Metabolics Reveals Biogenesis of Ascarosides, a Modular Library of Small-Molecule Signals in *C. elegans*" *J. Am. Chem. Soc.* (2012) 134(3), 1817-1824, which is incorporated herein by reference).

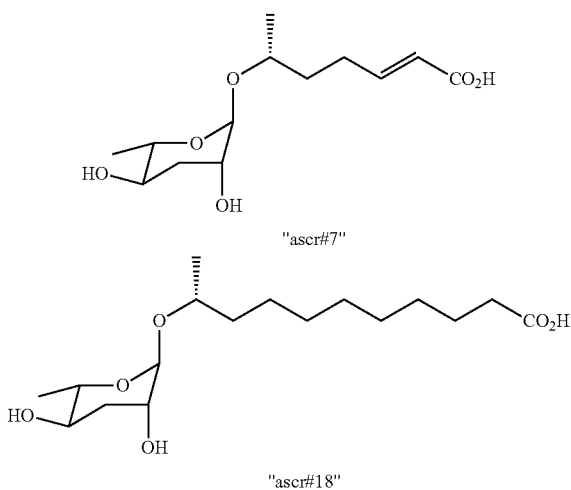

"ascr#7"

"ascr#18"

In certain embodiments, provided methods comprise acylating the 2- and 4-positions of the product 1-O-substituted ascarylose. In certain embodiments, the 2- and 4-positions are substituted with the same acyl group. In certain embodiments, the 2- and 4-positions may be substituted with different acyl groups. In certain embodiments, the acyl group is selected from the group consisting of: $C_{1-5}$ optionally substituted acyl, acetate, propionate, butanoate, pivalate, 2-ethyl hexanoate, octanoate, trifluoroacetate, $C_{5-20}$ optionally substituted acyl, benzoate, and substituted benzoate. In certain embodiments, the 2- and 4-positions are converted to their benzoate esters. In certain embodiments, the 2- and 4-positions are converted to substituted benzoate esters (e.g., chlorobenzoate, nitrobenzoate, methoxybenzoate, p-tert butylbenzoate, etc.). In certain embodiments, provided methods include acylating the 2- and 4-positions of the product 1-O-substituted ascarylose in a 'one-pot' procedure (e.g., without workup and isolation of the product from the hydride reduction of the sulfonated substrate). In certain embodiments, an acylating reagent (e.g., an acid chloride or acid anhydride) is added to the reaction vessel after completion of the hydride reduction step. Such addition may comprise a quenching step (e.g., direct addition to the reaction mixture) or may be performed after an initial quenching step (e.g., addition of a quench reagent such as water to consume excess hydride reducing agents, and/or to neutralize other reactive species present in the reaction mixture).

In certain embodiments where provided methods comprise substituting the 2- and 4- —OH groups of the product 1-O-substituted ascarylose, the 2- and 4-positions are substituted with a substituent other than an acyl group. Suitable groups include hydroxyl protecting groups described in *Protecting Groups in Organic Synthesis*, Peter G. M. Wuts, editor ISBN:9781118057483. In certain embodiments, the 2- and 4-positions are converted to ethers. In certain embodiments, the 2- and 4-positions are converted to benzyl ether, allyl ether, or tbutyl ether. In certain embodiments, the 2- and 4-positions are converted to silyl ethers (e.g. trimethylsilyl, triethyl silyl, t-butyldimethyl silyl and the like). In certain embodiments, the 2- and 4-positions are converted to acetal or ketal derivatives. In certain embodiments, it may be efficient to perform the conversion of the 2- and 4-positions of the product 1-O-substituted ascarylose to a 2-4-mono or bis substituted ether, silyl ether, acetal or ketal in a 'one-pot' procedure (e.g. without workup and isolation of the product from the previous reaction). In certain embodiments, a suitable reagent (e.g. an alkyl halide, silyl chloride, aldehyde, or ketone) is added to the reaction vessel after completion of the hydride reduction. Depending on the reactivity of the reagent employed, such addition may comprise a quenching step (e.g. direct addition to the reaction mixture) or may be performed after an initial quenching step (e.g. addition of a quench reagent to consume excess hydride reducing agents, and/or to neutralize other reactive species present in the reaction mixture prior to addition of the reagent).

In certain embodiments where provided methods comprise substituting the 2- and 4- —OH groups of the product 1-O-substituted ascarylose, the method comprises isolating the resulting 2-4-substituted 1-O-substituted ascarylose product with a non-polar solvent. Isolation using a non-polar solvent may result in substantial purification of the product as many reagents and by-products from the process are substantially insoluble in non-polar solvents and thus left behind during the extraction. In certain embodiments, the non-polar solvent used for the extraction comprises a hydrocarbon solvent such as petroleum ether, pentane, hexane, heptane and the like. In certain embodiments, the non-polar solvent used for the extraction comprises an aromatic solvent such as benzene, toluene, chlorobenzene and the like. In certain embodiments, the non-polar solvent may comprise an ether such as t-butyl dimethyl ether, dioxane, diphenyl ether and the like. In certain embodiments, the resulting extract contains the product in sufficient purity that it is possible to crystallize the product from the extract. In certain embodiments, the method comprises concentrating, cooling, or adding non-solvents to the extract to effect crystallization of the product ascarylose derivative.

In certain embodiments, provided methods are characterized by the quantity of feedstock used or product produced. While synthesis of ascarylose and its derivatives from rhamnose-based feedstocks have been reported in the prior art, there is no report of such processes being conducted at large scale. The prior art processes are generally unsuitable for use at large scale due the cost of reagents, used, the use of difficult reaction conditions (e.g. cryogenic temperatures) and/or the need for chromatographic purification of intermediates or final products. In contrast, the methods provided herein are feasible to use at multi-kg scale. Therefore, in certain embodiments, provided methods are characterized in that the feedstock is provided in a quantity of at least 100 g, at least 1 kg, at least 5 kg, at least 10 kg, at least 20 kg, or at least 50 kg. In certain embodiments, provided methods are characterized in that the 1-O-substituted ascarylose product is produced in a quantity of at least 100 g, at least 1 kg, at least 5 kg, at least 10 kg, at least 20 kg, or at least 50 kg.

EXAMPLES

The following examples embody certain methods of the present invention and are not intended to be limiting.

Example 1: Conversion of L-Rhamnose to Benzoylated-methyl-ascarylose

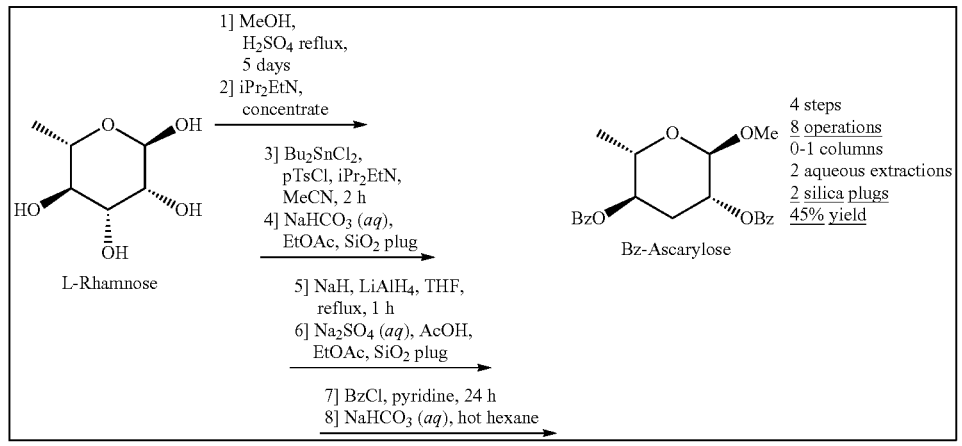

L-Rhamnose·H$_2$O (10.0 g, 55 mmol) was dissolved in MeOH (70 mL, 1.7 mol), H$_2$SO$_4$ (99%, 0.5 mL, 9.4 mmol, 0.2 equiv) was added, and the reaction was heated at reflux (oil bath, 90° C.) for 5 days. The reaction was cooled and concentrated in vacuo to ~20 mL and iPr$_2$EtN (1 mL,) was added to quench residual acid. The reaction was then concentrated to dryness, dissolved in MeCN (100 mL), iPr$_2$EtN added (8.4 g, 70 mmol total, 1.3 equiv), followed by Bu$_2$SnCl$_2$ (836 mg, 2.8 mmol, 0.1 equiv) and finally pTsCl (11.5 g, 60.2 mmol, 1.1 equiv). The reaction was stirred at room temperature for 2 hours and quenched with the addition of aqueous saturated NaHCO$_3$ (100 mL) and extracted with EtOAc (100 mL×3). The organic layers were combined and filtered through a 1.5" pad of silica and concentrated. The resulting clear oil was dissolved in THF (100 mL) and NaH (4.4 g, 110 mmol, 2.0 equiv) was added in small portions (approximately 10 portions) carefully to avoid extreme exotherm or H$_2$ gas release. The resulting yellow suspension was stirred for 15 minutes and LiAlH$_4$ (2.4 g, 63.2 mmol, 1.1 equiv) was added in a similar fashion (approximately 10 portions) careful to avoid extreme gas or heat release. Additional 100 mL of THF was added as the suspension turned into a thick foam and stirring ceased. A reflux condenser was attached to the flask and the reaction was heated at reflux (oil bath, 90° C.) for 1 h. The reaction was cooled to room temperature and saturated aqueous Na$_2$SO$_4$ was added dropwise until no bubbling occurred. AcOH was added until the crude reaction mixture pH~7 and was then filtered through a 1.5" pad of silica. The obtained products were a mixture of a yellow liquid (target product) and biphasic clear oil (from NaH) which can be removed by washing with hexanes. The target yellow oil was dissolved in pyridine (100 mL) and BzCl (15 mL, 129 mmol, 2.3 equiv) was added dropwise at 0° C. The reaction is stirred at room temperature for 24 h and allowed to warm to room temperature. Saturated aqueous NaHCO$_3$ (200 mL) was added and the reaction stirred for 2 h, evaporated in vacuo, and extracted with hot hexanes. The hexane layers were dried over Na$_2$SO$_4$, filtered, and evaporated to dryness to afford benzoylated-methyl-ascarylose (9.1 g, 24.7 mmol, 45% yield) as a clear oil which was further purified by column chromatography (1:9, EtOAc:Hex). The procedure provides benzoylated-methyl-ascarylose in yields ranging from 38% to 45% from rhamnose. $^1$H NMR: CDCl$_3$ (600 mHz): δ 8.11 (d, J=7.1 Hz, 2H), 8.03 (d, J=7.2 Hz, 2H), 7.61-7.54 (m, 2H), 7.50-7.41 (m, 4H), 5.22-5.20 (m, 2H), 5.20-5.15 (m, 1H), 4.74 (s, 1H), 4.07 (dq, J=9.7, 6.3 Hz, 1H), 3.48 (s, 3H), 2.42 (dt, J=13.4, 3.7, 3.4 Hz, 1H), 2.20 (ddd, J=13.5, 11.4, 3.2 Hz, 1H), 1.31 (d, J=6.3 Hz, 3H).

Example 2: Modified Conversion of L-Rhamnose to Benzoylated-methyl-ascarylose

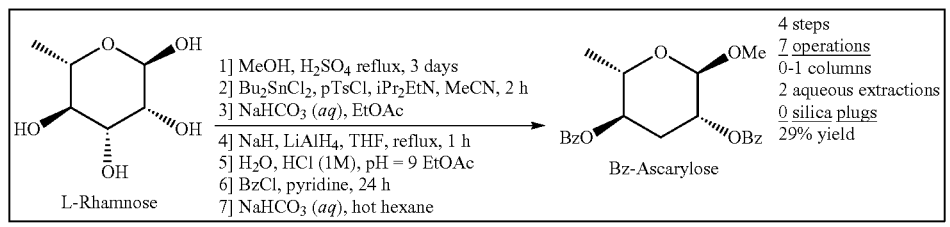

L-Rhamnose-H$_2$O (10.0 g, 55 mmol) was dissolved in MeOH (70 mL, 1.7 mol), H$_2$SO$_4$ (99%, 0.5 mL, 9.4 mmol, 0.2 equiv) was added, and the reaction was heated at reflux (oil bath, 90° C.) for 3 days. The reaction is cooled and concentrated in vacuo. The reaction is dissolved in MeCN (100 mL), iPr$_2$EtN added (8.4 g, 70 mmol total, 1.3 equiv), followed by Bu$_2$SnCl$_2$ (836 mg, 2.8 mmol, 0.1 equiv) and finally pTsCl (11.5 g, 60.2 mmol, 1.1 equiv). The reaction is stirred at room temperature for 2 hours and quenched with the addition of aqueous saturated NaHCO$_3$ (100 mL) and extracted with EtOAc (100 mL×3). The organic layers were combined and concentrated. The resulting oil was dissolved in THF (100 mL) and NaH (4.4 g, 110 mmol, 2.0 equiv) was added in small portions (approximately 10 portions) to avoid exotherm or H$_2$ gas release. The resulting yellow suspension was stirred for 15 minutes and LiAlH$_4$ (2.4 g, 63.2 mmol, 1.1 equiv) was added in a similar fashion (approximately 10 portions) to avoid vigorous gas or heat release. An additional 100 mL of THF was added as the suspension turned into a thick foam and stirring ceased. A reflux condenser was attached to the flask and the reaction was heated at reflux (oil bath, 90° C.) for 1 h. The reaction was cooled to room temperature and 30 mL of H$_2$O added dropwise to the reaction mixture and then neutralized with 1.0M HCl until the mixture separated into a clear bilayer at pH-9. The mixture was extracted with EtOAc (100 mL×3) and concentrated in vacuo. The obtained product was washed with hexanes to remove mineral oils. The crude product was dissolved in pyridine (100 mL) and BzCl (15 mL, 129 mmol, 2.3 equiv) was added dropwise at room temperature and stirred for 24 h. Saturated aqueous NaHCO$_3$ (200 mL) was added and the reaction stirred for 2 h, evaporated in vacuo, and extracted with hot hexanes. The hexane layers were dried over Na$_2$SO$_4$, filtered, and evaporated to dryness to afford benzoylated-methyl-ascarylose (9.1 g, 24.7 mmol, 45% yield) as a clear oil which was further purified by column chromatography (1:9, EtOAc:Hex) to provide the purified benzoylated-methyl-ascarylose in 21% yield from rhamnose.

Example 3

Example 3 is conducted according to the procedure of Example 1, except the process is conducted at a larger scale using 1 kg of starting L-Rhamnose and correspondingly increased quantities of all other reagents.

Example 4

Example 4 is conducted according to the procedure of Example 1, except methane sulfonic anhydride is used in place of tosyl chloride and calcium hydride is used in place of sodium hydride.

Example 5

Example 5 is conducted according to the procedure of Example 1, except methane sulfonic anhydride is used in place of tosyl chloride and calcium hydride is used in place of sodium hydride.

Example 6

Example 6 is conducted according to the procedure of Example 1, except the amount of dibutyl tin dichloride is reduced to 1 mol % relative to 1-O-methyl rhamnose.

Example 7

Example 7 is conducted according to the procedure of Example 2, except iron-(III) chloride is used in place of dibutyl tin dichloride.

Example 8

Example 8 is conducted according to the procedure of Example 2, excess potassium carbonate is used in place of iPr$_2$EtN.

Example 9: Deoxygenation of a Medium-Chain 1-O-Substituted Rhamnose Derivative

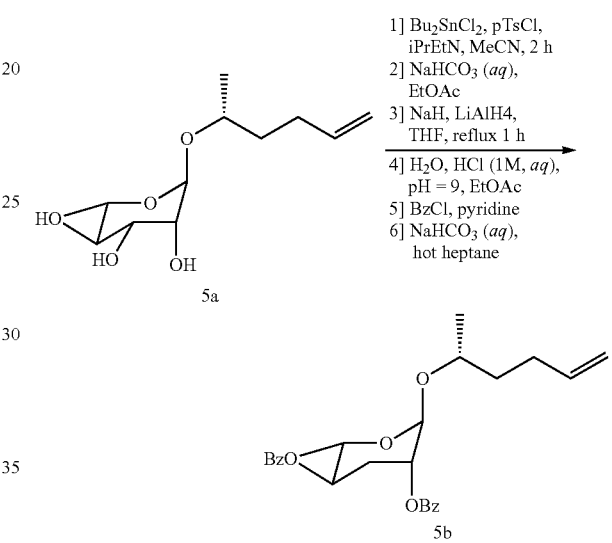

Compound 5a is dissolved in MeCN (100 mL), iPr$_2$EtN added (8.4 g, 70 mmol total, 1.3 equiv), followed by Bu$_2$SnCl$_2$ (836 mg, 2.8 mmol, 0.1 equiv) and finally pTsCl (11.5 g, 60.2 mmol, 1.1 equiv). The reaction is stirred at room temperature for 2 hours and quenched with the addition of aqueous saturated NaHCO$_3$ (100 mL) and extracted with EtOAc (100 mL×3). The organic layers are combined and concentrated. The resulting oil is dissolved in THF (100 mL) and NaH (4.4 g, 110 mmol, 2.0 equiv) is added in small portions (approximately 10 portions). The resulting yellow suspension is stirred for 15 minutes and LiAlH$_4$ (2.4 g, 63.2 mmol, 1.1 equiv) is added in a similar fashion. An additional 100 mL of THF is added, a reflux condenser is attached to the flask, and the reaction is heated at reflux (oil bath, 90° C.) for 1 h. The reaction is cooled to room temperature and 30 mL of H$_2$O is added dropwise to the reaction mixture then neutralized with 1.0M HCl until the mixture separates into a clear bilayer. The mixture is extracted with EtOAc (100 mL×3) and concentrated in vacuo. The obtained product is washed with hexanes to remove mineral oils. The crude product is dissolved in pyridine (100 mL) and BzCl (15 mL, 129 mmol, 2.3 equiv) is added dropwise at room temperature and stirred for 24 h. Saturated aqueous NaHCO$_3$ (200 mL) is added and the reaction stirred for 2 h, evaporated in vacuo, and extracted with hot hexanes. The hexane layers are dried over Na$_2$SO$_4$, filtered, and evaporated to dryness to afford compound 5b as an oil which is further purified by column chromatography (1:9, EtOAc:Hex).

Example 10: Deoxy Generation of a Long-Chain 1-O-Substituted Rhamnose Derivative

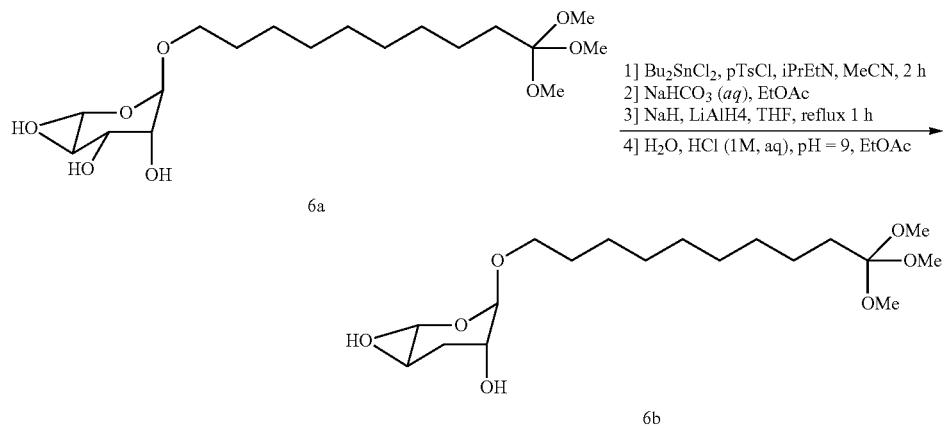

Compound 6a is dissolved in MeCN (100 mL), iPr$_2$EtN added (10 g, 70 mmol total, 1.3 equiv), followed by Bu$_2$SnCl$_2$ (836 mg, 2.8 mmol, 0.1 equiv) and finally pTsCl (11.5 g, 60.2 mmol, 1.1 equiv). The reaction is stirred at room temperature for 2 hours and quenched with the addition of aqueous saturated NaHCO$_3$ (100 mL) and extracted with EtOAc (100 mL×3). The organic layers are combined and concentrated. The resulting oil is dissolved in THF (100 mL) and NaH (4.4 g, 110 mmol, 2.0 equiv) is added in small portions (approximately 10 portions). The resulting yellow suspension is stirred for 15 minutes and LiAlH$_4$ (2.4 g, 63.2 mmol, 1.1 equiv) is added in a similar fashion. An additional 100 mL of THF is added, a reflux condenser is attached to the flask, and the reaction is heated at reflux (oil bath, 90° C.) for 1 h. The reaction is cooled to room temperature and 30 mL of H$_2$O is added dropwise to the reaction mixture then neutralized with 1.0M HCl until the mixture separates into a clear bilayer. The mixture is extracted with EtOAc (100 mL×3) and concentrated in vacuo to afford compound 6b as an oil.

Example 11

1-methy-L-Rhamnose- (10.0 g, 55 mmol) is dissolved in MeCN (100 mL), iPr$_2$EtN added (8.4 g, 70 mmol total, 1.3 equiv), followed by Bu$_2$SnCl$_2$ (84 mg, 0.3 mmol, 0.01 equiv) and finally pTsCl (11.5 g, 60.2 mmol, 1.1 equiv). The reaction is stirred at room temperature for 2 hours and quenched with the addition of saturated aqueous NaHCO$_3$ (100 mL) and extracted with EtOAc (100 mL×3). The organic layers are combined and concentrated. The resulting oil is dissolved in THF (200 mL) and NaH (4.4 g, 110 mmol, 2.0 equiv) is added in small portions. The resulting yellow suspension is stirred for 60 minutes and LiAlH$_4$ (2.4 g, 63.2 mmol, 1.1 equiv) is added in a similar fashion (approximately 10 portions) to avoid vigorous gas or heat release. The reaction is heated at reflux (oil bath, 90° C.) for 1 h. The reaction is cooled to room temperature and 50 mL of H$_2$O is added dropwise to the reaction mixture followed by 50 mL of 4N NaOH. The THF is stripped under reduced pressure and 50 mL of toluene is added. Most of the added toluene is removed by heating under reduced pressure and 100 mL additional toluene is added. To the resulting two-layer mixture is added benzoyl chloride (200 mmol) and tetra-butylammonium chloride (5 mmol, as a phase transfer catalyst). The biphasic mixture is stirred vigorously for 16 h, then allowed to settle. The toluene layer is separated and the aqueous residues are extracted with additional toluene (3×50 mL). The combined toluene fractions are dried over Na$_2$SO$_4$, filtered, and evaporated to dryness to afford benzoylated-methyl-ascarylose.

It is contemplated that compositions, systems, devices, methods, and processes of the present application encompass variations and adaptations developed using information from the embodiments described in the present disclosure. Adaptation or modification of the methods and processes described in this specification may be performed by those of ordinary skill in the relevant art.

It will be appreciated that use of headers in the present disclosure are provided for the convenience of the reader. The presence and/or placement of a header is not intended to limit the scope of the subject matter described herein. Unless otherwise specified, embodiments located in one section of the application apply throughout the application to other embodiments, both singly and in combination.

Throughout the description, where compositions, compounds, or products are described as having, including, or comprising specific components, or where processes and methods are described as having, including, or comprising specific steps, it is contemplated that, additionally, there are articles, devices, and systems of the present application that consist essentially of, or consist of, the recited components, and that there are processes and methods according to the present application that consist essentially of, or consist of, the recited processing steps.

It should be understood that the order of steps or order for performing certain action is immaterial so long as the described method remains operable. Moreover, two or more steps or actions may be conducted simultaneously.

The present invention provides efficient methods for the production of ascarylose and derivatives thereof from rhamnose. While prior methods relied on multistep sequences of hydroxyl group protection and deprotection to enable selective deoxygenation at the 3-position (e.g., *Organic Letters* 2017 19 (11), 2837-2840 DOI: 10.1021/acs.orglett.7b01009), the present invention provides a method that efficiently deoxygenates the 3-position of rhamnose without the need to protect the hydroxyl groups at the 2- or 4-positions. Other researchers have previously reported the selective functionalization of the 3-OH group of rhamnose; however, practical methods for deoxygenation at this position in the absence of protection of the 2- or 4-positions has not been previously achieved. In particular, the prior art (e.g., Baer et al. *Canadian J. Chem.* 63, 432 (1985); Ito et al., Chem. Pharm. Bull. 39(8), 1983-89 (1991); and Binkley, *J. Org. Chem.* 50, 5646 (1985)) demonstrates that such processes are likely to lead to rearrangement of the sugar backbone, or to provide mixtures of products where the desired 3-deoxy compound is at most a minor component. Thus, the methods of the invention provide significant advantages over the prior art.

All publications and patent applications mentioned in the specification are indicative of the level of those skilled in the art to which this invention pertains. All publications and patent applications are herein incorporated by reference to the same extent as if each individual publication or patent application was specifically and individually indicated to be incorporated by reference.

Although the foregoing invention has been described in some detail by way of illustration and example for purposes of clarity of understanding, it will be obvious that certain changes and modifications may be practiced within the scope of the appended claims.

What is claimed is:

1. A method for the production of 1-O-substituted ascarylose, comprising:
    providing as a feedstock a 1-O-substituted rhamnose having the structure of Formula II, wherein Z is a non-hydrogen substituent;

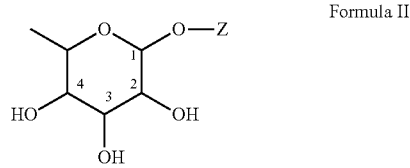

Formula II forming a mono-sulfonate ester at the 3-OH group of the feedstock; and
    treating the mono-sulfonate ester with a hydride source to form the 1-O-substituted ascarylose,
    wherein forming the mono-sulfonate ester is conducted on the 1-O-substituted rhamnose without hydroxyl protecting groups at either the 2-OH or 4-OH-positions.

2. The method of claim 1, wherein treating the mono-sulfonate ester with a hydride source further comprises adding a strong base.

3. The method of claim 2, wherein the strong base is added prior to addition of the hydride source.

4. The method of claim 2, wherein the strong base is selected from the group consisting of alkali metal hydrides, alkaline metal hydrides, alkali metal oxides, alkali metal alkoxides, and alkali metal amides.

5. The method of claim 2, wherein the strong base comprises a sodium or potassium ion.

6. The method of claim 1, wherein the hydride source is a metal hydride.

7. The method of claim 1, wherein treating the mono-sulfonate ester with a hydride source comprises contacting the mono-sulfonate ester with a first metal hydride and a second metal hydride.

8. The method of claim 1, wherein forming the mono-sulfonate ester comprises contacting the feedstock with a sulfonyl halide or sulfonic acid anhydride in the presence of a Lewis acid catalyst.

9. The method of claim 8, wherein the Lewis acid catalyst comprises a tin compound.

10. The method of claim 9, wherein the Lewis acid catalyst comprises a dialkyl tin compound.

11. The method of claim 10, wherein the Lewis acid catalyst comprises a dialkyl tin dihalide.

12. The method of claim 8, wherein the Lewis acid catalyst comprises a boron compound or a transition metal.

13. The method of claim 1, wherein the feedstock comprises 1-O-methyl rhamnose.

14. The method of claim 1, wherein Z of Formula II is an optionally substituted $C_{2-24}$ aliphatic group.

15. The method of claim 1, wherein Z of Formula II is a group having the following formula:

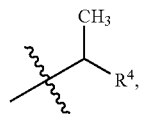

where $R^4$ is selected from the group consisting of:
        an optionally substituted $C_{1-40}$ aliphatic group;
        an optionally substituted $C_{1-40}$ carboxylic acid chain which may optionally be unsaturated at one or more positions; and
        an ester or orthoester derivative of an optionally substituted $C_{1-40}$ carboxylic acid chain which may optionally be unsaturated at one or more positions.

16. The method of claim 1, wherein Z of Formula II is

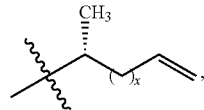

where x is an integer from 1 to 30.

17. The method of claim 16, wherein Z of Formula II is

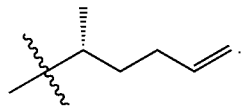 [SMILES: *[C@H](C)CCC=C]

18. The method of claim 1, wherein treating the mono-sulfonate ester with a hydride source to form a 1-O-substituted ascarylose concomitantly reduces one or more functional groups on Z.

19. The method of claim 1, further comprising isolating the 1-O-substituted ascarylose, wherein the 1-O-substituted ascarylose is isolated in at least 40% yield based on the feedstock.

20. The method of claim 1, wherein the method is conducted using at least 1 kg of the feedstock.

21. A method for the production of 1-O-substituted ascarylose, comprising:
    providing, as a feedstock, the 3-sulfonate ester of a 1-O-substituted rhamnose derivative having the structure of Formula IV, wherein Z is a non-hydrogen substituent and Q is an optionally substituted aliphatic or aromatic moiety:

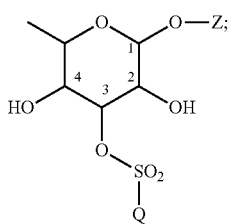

Formula IV and treating the mono-sulfonate ester with a strong base and a hydride source to form the 1-O-substituted ascarylose.

22. The method of claim 21, wherein the strong base is added prior to addition of the hydride source.

23. The method of claim 21, wherein the strong base is selected from the group consisting of alkali metal hydrides, alkaline metal hydrides, alkali metal oxides, alkali metal alkoxides, and alkali metal amides.

24. The method of claim 21, wherein the strong base comprises a sodium or potassium ion.

25. The method of claim 21, characterized in that a yield of the 1-O-substituted ascarylose is greater than 50%, greater than 60%, greater than 65%, greater than 70%, greater than 75%, greater than 70%, greater than 85%, or greater than 90%.

26. The method of claim 21, characterized in that the method results in production of less than 40% of ring contracted rearrangement products, less than 30%, less than 25%, less than 20%, less than 15%, less than 10%, or less than 5% of ring contracted rearrangement products.

27. The method of claim 21, further comprising the step of acylating the 2-OH and 4-OH hydroxyl groups of the 1-O-substituted ascarylose by adding an acylating reagent to a mixture resulting from the treatment of the feedstock with the hydride source and the strong base.

28. The method of claim 27, wherein the acylating reagent is added to the mixture without a quenching step.

29. The method of claim 27, wherein the acylating reagent is added to the mixture after a quenching step.

* * * * *